United States Patent Office 3,022,322
Patented Feb. 20, 1962

3,022,322
PROCESS FOR THE PRODUCTION OF
EPOXIDIZED POLYBUTADIENE
Charles E. Wheelock and Peter J. Canterino, Bartlesville, Okla., assignors to Phillips Petroleum Company, a corporation of Delaware
No Drawing. Filed Sept. 28, 1956, Ser. No. 612,890
10 Claims. (Cl. 260—348.5)

This invention relates to epoxidized polybutadiene. In another aspect, it relates to a method of producing epoxidized polybutadiene.

Certain resins heretofore produced which contain a small amount of epoxy oxygen have been somewhat deficient in regard to their molding properties. Where these resins are formed into castings, discoloration of the polymer oftentimes occurs, and the product shrinks in the mold. Further, such resins are not adherent to glass.

We have discovered that an epoxidized polybutadiene product containing at least 0.08 atom of epoxy oxygen per double bond present in the original polymer forms an excellent casting resin which is clear, adherent to glass, has a light brown to colorless color, and is free from voids. Such product also has the desirable property of setting up at low temperatures, even as low as room temperatures. Surprisingly, these advantages are not manifested where the material contains less than 0.08 atom of epoxy oxygen per double bond present in the original polymer, say 0.02 or 0.03. These desirable properties are particularly manifested by casting or laminating resins of epoxidized liquid polybutadiene where the material contains 0.13 to 0.5 atom of epoxy oxygen per double bond present in the original polymer.

The novel epoxidized polybutadiene products of the invention are characterized in that the original unsaturated portion of the molecule is converted by the epoxidation reaction so that it contains (1) 8 to 70 percent of units selected from the group consisting of

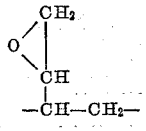

and

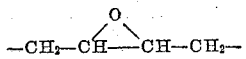

(2) up to 85 percent of units selected from the group consisting of

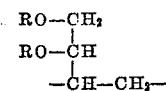

and

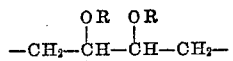

where R is selected from the group consisting of H and

$R_1$ being an alkyl or aryl group of 1 to 20 carbon atoms, and (3) 10 to 35 percent of units selected from the group consisting of

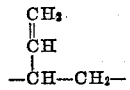

and

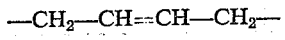

A more restricted range wherein the advantages of the invention are particularly evidenced is characterized by the presence of 13 to 50 percent of units (1) defined above, 15 to 77 percent of units (2) defined above, and 10 to 35 percent of units (3) defined above.

We have further discovered that liquid polybutadiene can be epoxidized by carefully controlling the reaction conditions. The reaction is carried out by reacting a liquid polymer with an organic peracid under carefully controlled conditions of time and temperature. Preformed organic peracids can be used and, in some cases, we have shown that a small amount of acid catalyst can be present although the amount must be carefully controlled since the acid catalyst increases the tendency for ring opening in the epoxide linkage. Another suitable method, and one which is preferred because of process simplification resulting therefrom, is to form the organic peracid in situ by using an ion exchange resin to catalyze the formation of the peracid. More specifically, a nuclear sulfonic cation exchange resin, such as Amberlite Resin IR-120, Permutit Q, Nalcite HCR, and Dowex 50X, catalyzes the reaction between an organic acid and hydrogen peroxide. By these resins, we mean sulfonated polymers of styrene wherein the sulfonic acid groups are attached to the aromatic nucleus. This method is preferred because the ion exchange resin does not appear to cause excessive cleavage of the epoxy ring. Obviously, higher temperatures can be used with correspondingly shorter reaction times when there is less tendency for ring cleavage.

It is believed that the invention can be best understood from specific examples and the following are given to illustrate details of this invention. The specific amounts and operation details set forth should not be considered as unduly limiting the invention.

Epoxy oxygen content was determined by the hydrochloric acid-dioxane method given in Organic Analysis, Mitchell et al., volume I, pages 135–136, Interscience Publishers, Inc., New York (1953). Total oxygen content was determined by pyrolyzing the sample in an atmosphere of nitrogen, converting the oxygen compounds formed to carbon monoxide by passage of the gases over carbon at a temperature of 1120° C., passing the gases through a liquid nitrogen trap to remove interfering substances, oxidizing the carbon monoxide to carbon dioxide by means of copper oxide kept at a temperature of 300° C., collecting the resulting carbon dioxide in a liquid nitrogen trap, and, after pumping out the residual gases by means of a vacuum pump, determining the carbon dioxide manometrically in a standard volume. In the following examples, the amount of epoxy oxygen per double bond was calculated from the determination of epoxy oxygen and total oxygen assuming that all oxygen was present as epoxy oxygen or hydroxyl oxygen.

EXAMPLE I

Liquid polybutadiene, prepared in accordance with the method of Crouch 2,631,175 by mass polymerization using finely divided sodium as a catalyst, and having a viscosity of 1362 Saybolt Furol seconds at 100° F. and a Gardner color of 11, was stripped in a batch operation by vigorous flushing with nitrogen. For this operation, the polymer was charged to a pot and heated in an oil bath which had a temperature of 380 to 400° F. The pot was evacuated to 10 to 20 mm. Hg absolute pressure and the pressure was maintained at this level while nitrogen was flushed through the polymer over a 45-minute period.

A portion of the polymer stripped by the above-described procedure having 74.2 percent of the theoretical unsaturation, i.e., 0.742 double bonds per $C_4$ unit, and a molecular weight of about 1500, was epoxidized by the following method. Four hundred thirty-two grams of the stripped liquid polybutadiene was dissolved in two liters of ethyl acetate and placed in a flask surrounded by a cooling bath. The flask contents were stirred until a temperature of 16° C. was reached. A solution containing 1056 grams of commercial peracetic acid and 120 grams of sodium acetate trihydrate was then added to the cooled flask gradually to prevent excessive temperature rise. The peracetic acid was obtained from Buffalo Electro-Chemical Company, Inc., and was a crystal clear liquid of 1.18 specific gravity at 20° C. containing 3.4 weight percent active oxygen (minimum) and assaying 40 percent peracetic acid. The addition of the peracid solution required 36 minutes, during which period the temperature rose to 17.5° C. The temperature was again lowered to 16° C., and the contents of the flask were stirred and maintained at this temperature for 24 hours. At the end of 24 hours, 500 milliliters of water was added to the flask, the aqueous phase was separated, and the product was washed several times with water and dilute sodium bicarbonate solution until the organic phase tested neutral to litmus. The neutral organic phase was then dried over anhydrous sodium sulfate, and the solvent (ethyl acetate) was then stripped off by warming under vacuum. The remaining portion of the organic phase was then recovered and found to be epoxidized liquid polybutadiene.

EXAMPLE II

A number of runs were made in each of which a portion of the stripped liquid polybutadiene of Example I was epoxidized using various organic peracids. The procedures used were essentially the same as described in Example I, with exception being that different organic peracids were employed. The results of several of these runs are expressed below as Table I.

the temperature ranging between 58 and 69° C. during this time. At the end of this time, the reaction mixture was cooled to room temperature, the ion exchange resin removed by filtration, 500 milliliters of distilled water were added, the aqueous phase separated, and the product washed several times with water and dilute sodium bicarbonate solution until the organic phase tested neutral to litmus. The organic phase was then dried over anhydrous sodium sulfate, and the solvent was stripped off by warming under vacuum. The epoxidized product had a total oxygen content of 13.0 percent of which 44.1 percent was oxirane oxygen. The resulting epoxidized liquid polybutadiene contained an oxirane oxygen content of 0.26 epoxy oxygen atom per double bond originally present in the polymer.

EXAMPLE IV

A series of runs were carried out in which liquid polybutadiene which had been prepared by essentially the same procedure as described in Example I and having an unsaturation of 82.5 percent of theoretical was epoxidized by means of peracetic acid which was formed within the reaction flask. In these runs, 108 grams of liquid polybutadiene, 580 grams of chloroform (solvent), 68 grams of 50 percent by weight hydrogen peroxide, 70 grams of ion exchange resin (Amberlite IR–120), and 9.2 grams of glacial acetic acid were charged to the reaction flask. The hydrogen peroxide was charged to the flask last and this addition was carried out gradually to avoid undue temperature rise. The reaction was carried out for the desired period of time at a constant temperature level, after which the product was recovered and analyzed. The re-

*Table I*

|  | Run I | Run II [1] | Run III [1] | Run IV [1] | Run V | Run VI | Run VII | Run VIII |
|---|---|---|---|---|---|---|---|---|
| Grams liquid polybutadiene used | 36.6 | 32.4 | 32.4 | 32.4 | 32.4 | 432 | 432 | 432. |
| Organic peracid used | Peracetic | Perbenzoic | Perbenzoic | Perbenzoic | Peracetic | Peracetic | Peracetic | Peracetic. |
| Grams (40%) peracid used [2] | 50 | 10.23 | 54.05 | 30 | 105.7 | 792 | 594 | 423. |
| Solvent used | Acetic acid | Toluene | Chloroform | Chloroform | Benzene | Ethyl acetate | Ethyl acetate | Ethyl acetate. |
| Vol. solvent (mls.) | 100 | 930 | 1,675 | 900 | 200 | 2,000 | 2,000 | 2,000. |
| Grams sodium acetate trihydrate used | 10 | 0 | 0 | 0 | 10 | 90 | 67.5 | 120. |
| Reaction temp. (° C.) | 11–21 | 3–17 | 1–25 | −6 to 23 | 13–30 | 19–22 | 22–30 | 16–17.5. |
| Reaction time (hrs.) | 13 | 4¼ | 118¼ | 17¾ | 24 | 24 | 13½ | 24. |
| Product analysis: |  |  |  |  |  |  |  |  |
| Weight percent epoxy oxygen | 3.80 | 5.5 | 8.38 | 7.96 | 7.6 | 7.3 | 6.6 | 7.5. |
| Weight percent total oxygen | 9.0 | 10.4 | 19.32 | 10.69 | 27.4 | 14.4 | 12.6 | 14.8. |
| Atoms epoxy oxygen/double bond present in original polymer | 0.19 | 0.28 | 0.46 | 0.38 | 0.48 | 0.38 | 0.34 | 0.40. |

[1] These runs were carried out in an anhydrous sytem.
[2] In the runs employing perbenzoic acid, the peracid eas 100 percent perbenzoic acid.

EXAMPLE III

A portion of the stripped liquid polybutadiene described in Example I weighing 432 grams, 2,000 milliliters of ethyl acetate, 266 grams of 50 percent hydrogen peroxide, 35 milliliters of acetic acid and 281.3 grams of an ion exchange resin (Amberlite Resin IR–120) were charged to a flask. The hydrogen peroxide was added last and this addition was carried out gradually to prevent undue temperature rise. Prior to use, the resin had been conditioned by washing with water, a ten percent hydrochloric acid solution, water, a ten percent sodium chloride solution and repeating this four-step washing three times. Following this, the resin was washed with a ten percent hydrochloric acid solution and finally with glacial acetic acid. The reaction continued for two and one half hours, sults of these runs are expressed below as Table II.

*Table II*

| Run No. | Mols organic acid charged/double bond | Hours at— | | Product analysis | | Epoxy oxygen percent of total oxygen | Epoxy oxygen/double bond in original poylmer |
|---|---|---|---|---|---|---|---|
|  |  | 10° C. | 50° C. | Weight percent epoxy oxygen | Weight percent total oxygen |  |  |
| IX | 0.093 | 8 |  | 3.9 | 5.2 | 75.0 | 0.139 |
| X | 0.093 | 16 |  | 5.5 | 7.5 | 73.4 | 0.244 |
| XI | 0.093 | 24 |  | 6.3 | 9.3 | 67.8 | 0.284 |
| XII | 0.093 |  | 3 | 8.0 | 11.3 | 70.8 | 0.37 |
| XIII | 0.093 |  | 7 | 8.7 | 12.0 | 72.5 | 0.405 |
| XIV | 0.093 |  | 24 | 9.1 | 12.5 | 72.9 | 0.425 |

EXAMPLE V

A series of runs were made in which portions of the liquid polybutadiene of Example IV were epoxidized by means of commercial peracetic acid. In these runs, 580 grams of chloroform, 108 grams of liquid polybutadiene, 190.2 grams of 40 percent (by weight) commercial peracetic acid, and 19 grams of sodium acetate trihydrate were charged to the reaction flask of the previous examples. The sodium acetate trihydrate was employed to neutralize the sulfuric acid present in the commercial peracetic acid. The mixture of commercial peracetic acid and sodium acetate trihydrate was added gradually to the polymer solution to prevent undue temperature rise. The results of these runs are expressed below as Table III.

*Table III*

| Run No. | Mols organic acid charged/ double bond | Hours at— | | Product analysis | | Epoxy oxygen percent of total oxygen | Epoxy oxygen/ double bond in original polymer |
|---|---|---|---|---|---|---|---|
| | | 10° C. | 50° C. | Weight percent epoxy oxygen | Weight percent total oxygen | | |
| XV | 1.04 | 8 | | 6.7 | 11.3 | 57.3 | 0.31 |
| XVI | 1.04 | 16 | | 6.5 | 11.3 | 57.5 | 0.31 |
| XVII | 1.04 | 24 | | 6.6 | 13.0 | 50.8 | 0.31 |
| XVIII | 1.04 | | 3 | 6.8 | 12.4 | 54.8 | 0.318 |
| XIX | 1.04 | | 7 | 5.7 | 15.0 | 38.0 | 0.275 |
| XX | 1.04 | | 24 | 5.2 | 15.6 | 33.3 | 0.282 |

EXAMPLE VI

A series of runs in which liquid polybutadiene was epoxidized were carried out in which commercial peracetic acid containing 40 percent by weight peracid was used. Prior to charging the peracid to the flask, the sulfuric acid in the commercial peracid was neutralized with sodium acetate trihydrate. The peracid sodium acetate trihydrate mixture was added gradually as previously described. The results of these runs are expressed as Table IV. The product, epoxidized liquid polybutadiene, was worked up and analyzed by the same method employed in Example I.

EXAMPLE VII

A series of epoxidation runs were carried out on the liquid polybutadiene of Example IV wherein an acid catalyst was used to catalyze the formation of peracetic acid in the reaction zone. In each run, 108 grams of liquid polybutadiene, 580 grams of chloroform, 68 grams of fifty percent hydrogen peroxide, and the indicated amounts of acetic acid and additional acid were charged. Gradual addition of the hydrogen peroxide was employed as in the runs of the previous examples. Water was added where necessary to provide runs wherein the water content was identical in each run. All these runs were carried out at 50° C. and the results are tabulated in Table V. The epoxidized liquid polybutadiene was recovered and analyzed by essentially the same procedure as described in Example I.

*Table V*

| Run No. | Grams acetic acid | Grams sulfuric acid | Grams trichloro- acetic acid | Grams phos- phoric acid | Grams water | Epoxy oxygen content (percent) after— | | | Total oxygen content (percent) after— | | |
|---|---|---|---|---|---|---|---|---|---|---|---|
| | | | | | | 3 hours | 7 hours | 24 hours | 3 hours | 7 hours | 24 hours |
| XXVI | 9.2 | 1 | | | 0.30 | 1.6 | 2.8 | 5.2 | 3.5 | 6.0 | 9.9 |
| XXVII | 9.2 | 2 | | | 0.25 | 2.3 | 3.8 | 5.5 | 4.7 | 7.4 | 11.0 |
| XXVIII | 9.2 | 3 | | | 0.20 | 2.2 | 3.7 | 5.7 | 4.5 | 7.3 | 11.3 |
| XXIX | 9.2 | | 3.34 | | 0.35 | 0.5 | 0.8 | 1.5 | 1.5 | 2.5 | 5.6 |
| XXX | 9.2 | | | 2.35 | 0.00 | 0.8 | 1.7 | 3.5 | 3.0 | 3.0 | 5.3 |
| XXXI | 50 | | 3.34 | | 0.35 | 0.7 | 1.2 | 2.6 | 3.2 | 3.8 | 6.4 |

EXAMPLE VIII

A run was made in which liquid polybutadiene, prepared by essentially the same process as described in Example I, was epoxidized according to the process of this invention. The liquid polybutadiene employed in this run had a viscosity of approximately 500 Saybolt Furol seconds at 100° F. Accordingly, 432 grams of the above-described liquid polybutadiene and 2000 milliliters of chloroform were charged to a flask surrounded by a cooling bath. A mixture of 350 grams of commercial peracetic acid containing 40 percent by weight peracetic acid, and 39 grams of sodium acetate trihydrate was then charged to the flask. The mixture was added at intervals to keep the temperature below 16° C., this addition requiring one hour. The bath temperature was 10° C., and the reaction mass was stirred at this temperature for 23 hours after the peracid was charged. At the end of this time, the product was washed and recovered as described in Example I. Epoxidized liquid polybutadiene was recovered.

The use of a solvent in the present process reduces the amount of cleavage of the epoxy ring. Examples of suitable solvents include ethyl acetate, acetic acid, methyl acetate, aromatic hydrocarbons such as benzene and toluene, halogenated aliphatic hydrocarbons such as chloroform, and aliphatic hydrocarbons such as normal hexane. In general, any material which is a solvent for the liquid polymer and which is inert with respect to the reactants can be used.

*Table IV*

| Run No. | Grams liquid polybu- tadiene | Grams com- mercial peracetic acid | Solvent employed | Mls. solvent | Reaction temp., ° C. | Reaction time, hours | Active oxygen charged per double bond | Product analysis | | Epoxy oxygen percent of total oxygen | Epoxy oxygen/ double bond in original polymer |
|---|---|---|---|---|---|---|---|---|---|---|---|
| | | | | | | | | Weight percent epoxy oxygen | Weight percent total oxygen | | |
| XXI | 32.4 | 105.7 | Benzene | 200 | 13–30 | 24 | 1.25 | 7.6 | (1) | | (2) |
| XXII | 432 | 1,057 | Ethyl acetate | 2,000 | 16–17 | 24 | 0.94 | 7.45 | 14.79 | 50.4 | 0.40 |
| XXIII | 432 | 792 | ...do... | 2,000 | 19–22 | 24 | 0.70 | 7.18 | 14.43 | 49.7 | 0.38 |
| XXIV | 432 | 594 | ...do... | 2,000 | 22–30 | 25.75 | 0.53 | 6.53 | 12.64 | 51.5 | 0.34 |
| XXV | 432 | 350 | ...do... | 2,000 | 6.5–25 | 24 | 0.31 | 5.04 | 8.92 | 56.5 | 0.25 |

[1] Not measured.  [2] Not determined.

The liquid polymers used in this invention have a molecular weight less than 5,000, preferably less than 2,000, and at least 500, and have a viscosity in the range of 100 to 6,000 Saybolt Furol seconds at 100° F. The liquid polymers of butadiene which can be epoxidized according to the method of this invention are those which are prepared by a solution polymerization employing an alkali metal as the catalyst. The preferred alkali metals are sodium and potassium. The solution polymerization can be carried out by contacting a 3 to 50 weight percent solution of butadiene in a suitable solvent with an amount of an alkali metal within the range between 0.5 and 15 parts by weight per 100 parts butadiene. The polymerization is carried out at a temperature within the range of from 60 to 170° C. at a pressure sufficient to keep the butadiene in the liquid state. Suitable solvents which can be employed are paraffinic hydrocarbons such as pentane, hexane, and higher hydrocarbons, generally below $C_{10}$ paraffinic hydrocarbon, cycloparaffins such as cyclohexane, and aromatic hydrocarbons such as benzene and toluene. A more complete description of a suitable polymerization procedure is given in U.S. 2,631,175.

These polymers can be used directly following their recovery from the polymerization operation or they can be treated to remove low molecular weight polymers. Crouch et al., in application Serial No. 483,162, filed January 20, 1955, now U.S. Patent 2,826,565, describes a process for the removal of these low molecular weight polymers. The removal process therein comprises stripping the liquid polymer with an inert gas such as nitrogen, steam, saturated hydrocarbons, carbon dioxide, oxygen-free flue gas, and the like. Preferred conditions for this stripping include a temperature in the range of 220 to 425° F., a pressure in the range of 0.5 to 760 millimeters of mercury and a gas-to-polymer ratio in the range of 30 to 25,000 volumes of gas per volume of liquid polymer. This stripping is carried out over a time of 5 to 300 minutes, it generally taking a time of 15 to 45 minutes.

This invention is applicable to the use of a variety of organic peracids including peracetic acid, perpropionic acid, perbutyric acid, pervaleric acid, perbenzoic acid, and perphthalic acid.

While the method of preparation of the peracid does effect the reaction, peracids prepared by various methods can be used. We have carried out the reaction using commercially available peracetic acid. When employing commercial organic peracids, or when employing previously formed peracids, it is preferred to neutralize the mineral acid usually present in the peracid. The mineral acids are used in the preparation of organic peracids to catalyze the reaction between the organic acid and hydrogen peroxide. Suitable neutralizing agents which can be employed include sodium acetate, sodium bicarbonate, sodium carbonate, and the like. Other salts of organic acids containing at least two carbon atoms per molecule can be employed. These neutralizing agents should be added only in the amount necessary to neutralize the mineral acid present. These polymers can be epoxidized by means of a solution of peracetic acid in glacial acetic acid under anhydrous conditions. For example, peracetic acid can be formed in glacial acetic acid by the action of 30 percent hydrogen peroxide and sufficient acetic anhydride to provide an anhydrous solution, a sulfuric acid catalyst being used in some instances.

In another method, acetic anhydride can be omitted and the peracid prepared by reacting glacial acetic or acetic acid of high concentration with aqueous hydrogen peroxide solution (30 to 90 percent) with an organic or inorganic acid catalyst such as sulfuric acid, phosphoric acid, trichloroacetic, etc. As set forth above, the ion exchange resin technique is also highly suitable. The resins which can be used are the nuclear sulfonic cation exchange resins such as Amberlite IR-120 and Dowex 50X.

The relationship of time and temperature must also be carefully controlled in order to avoid or limit conversion of epoxy groups to hydroxyl groups when working in an aqueous medium. Broadly, the temperature range we have used is in the range of 0 to 80° C. using a reaction time of one half to 120 hours. A reaction time of 1 to 12 hours is perferred and, as the temperature increases, the reaction time should be shortened. For instance, at 60° C., a time of 2 and one half hours is generally sufficient. Also, it is preferred to keep the temperature below 40° C. when operating with commercial peracids.

In preferred operation, the peroxygen containing compound is added gradually to the reaction mixture containing the rest of the components in order to prevent excessive temperature rise.

The ratio of reactants determines, to a great extent, the percentage of epoxy oxygen in the product. Generally, we use a ratio of 0.2 to 2 equivalents of peracid (each

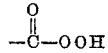

group being considered one equivalent) per olefinic linkage originally present in the polymer.

The products of our invention are light yellow, sticky, viscous liquids having viscosities in the range of 500 to 300,000 Saybolt Furol seconds at 100° F. and a specific gravity of 0.91 to 1.2. One unusual property of the products of this invention is the rate at which the viscosity of these materials changes with variation in temperature. For example, a sample of epoxidized liquid polybutadiene prepared according to the method of this invention, which contained 0.246 epoxy oxygen per double bond originally present in the butadiene polymer, had a viscosity of greater than 400,000 centipoises at 25° C. The same epoxidized material had a viscosity of 19,470 centipoises at 60° C. These materials are especially suitable for bonding agents used in the production of laminated articles. Upon curing with an amine, or other catalyst, strong bonds are formed with glass, wood, metal, paper, etc.

For instance, the product from run VI (Example II) was used as a laminating resin for fiberglass cloth. A portion thereof was mixed with diethylenetriamine so as to form a solution which contained 11.1 percent by weight of the amine and the mixture applied to the cloth to build up to a twelve-ply laminate. The laminate was placed in a press and compressed to a thickness of ⅛ inch. After curing 24 hours at 150° C., the laminate had a flexural strength of 40,900 p.s.i. This use of the epoxidized product constitutes the subject matter of application of Wheelock, Serial No. 626,286, filed December 5, 1956.

These epoxidized liquid polymers contain from 0.08 to 0.7 epoxy oxygen atom per double bond originally present in the polymer. In addition to their use as laminating resins previously discussed, they are also useful as potting resins, adhesives, and the like. Products containing different amounts of epoxy oxygen can be blended to obtain products containing intermediate oxygen content. Furthermore, these resins can be blended with alkyd resins, natural and synthetic drying oils, and the like, and used in coating compositions, as potting compounds and the like.

The epoxide-containing products of our invention are colorless to light amber and when thermoset yield products which are colorless to light brown. The molded products are clear, free from voids, adherent to glass and have the desirable property of setting up at low temperatures. This is to be distinguished from products prepared with small amounts of epoxy oxygen which do not adhere to glass, and which become discolored or black upon casting.

The epoxidized polybutadiene is formed from a multiplicity of recurring chain units, 10 to 30 percent of which are defined by groups of units, each unit having a chain of four carbon atoms, said groups being free of ethylenic unsaturation. These groups may, for example, have the structure

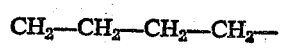

and

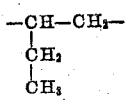

The remainder of the molecule is composed of (a) eight to seventy percent of the following units

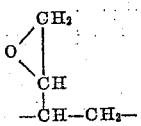

and

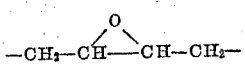

(b) up to eighty-five percent of the following units

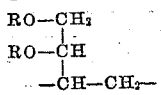

and

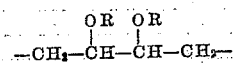

where R is H or

$R_1$ being an alkyl or aryl group of 1 to 20 carbon atoms, and (c) 10 to 35 percent of units having the formula

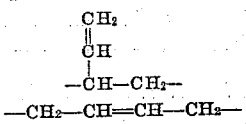

or

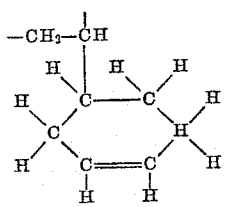

The foregoing data clearly illustrate additional important advantages for the polymers containing thirteen to fifty percent of units (1) above, fifteen to seventy-seven percent of units (2) above, and ten to thirty-five percent of units (3) above.

The definition of the above structural units is based on a combination of chemical analysis and spectrographic study. The presence of the epoxide groups was established by chemical analysis. The configuration of the carbon skeleton and the presence of certain functional groups was based on the results of the spectrographic study.

As many possible embodiments may be made of this invention without departing from the scope thereof, it is to be understood that all matter herein set forth is to be interpreted as illustrative and not as unduly limiting the invention.

We claim:

1. A process for producing epoxidized liquid polybutadiene comprising dissolving loquid polybutadiene in an inert solvent; reacting said polymer with an organic peracid formed in situ by adding to the solution of said polymer an organic acid containing two to eight carbon atoms at a temperature of 0 to 80° C., the amount of organic acid being sufficient to provide 0.2 to 2 equivalents per olefinic linkage in said liquid polybutadiene, hydrogen peroxide, and an acid catalyst selected from the group consisting of sulfuric acid, phosphoric acid, trichloroacetic acid and nuclear sulfonic cation exchange resins; separating the organic phase from the aqueous phase and removing the solvent from the organic phase thereby obtaining resulting epoxidized polymer containing 0.08 to 0.7 epoxy oxygen atom per double bond originally present in said polymer.

2. A process for producing epoxidized liquid polybutadiene comprising dissolving liquid polybutadiene in an inert solvent; reacting said polymer with a peracid formed in situ by adding to the solution of said polymer an organic acid containing two to eight carbon atoms at a temperature in the range of 0 to 80° C., the amount of said organic acid being sufficient to provide 0.2 to 2 equivalents per olefinic linkage, hydrogen peroxide, and a nuclear sulfonic cation exchange resin; separating the organic phase from the aqueous phase and removing the solvent from the organic phase thereby obtaining resulting epoxidized polymer containing 0.08 to 0.7 epoxy oxygen atom per double bond originally present in said polymer.

3. A process for producing epoxidized liquid polybutadiene comprising dissolving liquid polybutadiene having a viscosity of 100 to 60,000 Saybolt Furol seconds at 100° F. in ethyl acetate; reacting said polybutadiene with peracetic acid formed in situ by adding to the solution of said polymer acetic acid, hydrogen peroxide, and a nuclear sulfonic cation exchange resin, the amount of said acid being sufficient to provide 0.2 to 2 equivalents per olefinic linkage; conducting the reaction at a temperature of 0 to 80° C. for a time of 120 to one half hours; separating the organic phase from the aqueous phase and removing the solvent from the organic phase thereby obtaining resulting epoxidized polymer containing 0.08 to 0.7 epoxy oxygen atom per double bond originally present in said polymer.

4. A process for producing epoxidized liquid polybutadiene comprising dissolving liquid polybutadiene in an inert solvent; reacting said polymer with a peracid formed in situ by addition to the solution of said polymer an organic acid containing two to eight carbon atoms at a temperature of 0 to 80° C., the amount of said organic acid being sufficient to provide 0.2 to 2 equivalents per olefinic linkage, hydrogen peroxide, and sulfuric acid; separting the organic phase from the aqueous phase and removing the solvent from the organic phase thereby obtaining epoxidized polymer containing 0.08 to 0.7 epoxy oxygen atom per double bond originally present in said polymer.

5. A process for producing epoxidized liquid polybutadiene comprising dissolving liquid polybutadiene in an inert solvent; reacting said polymer with a peracid formed in situ by adding to the solution of said polymer an organic acid containing two to eight carbon atoms at a temperature of 0 to 80° C., the amount of said organic acid being sufficient to provide 0.2 to 2 equivalents per olefinic linkage, hydrogen peroxide, and trichloroacetic acid; separating the organic phase from the aqueous phase and removing the solvent from the organic phase thereby obtaining resulting epoxidized polymer containing 0.08 to 0.7 epoxy oxygen atom per double bond originally present in said polymer.

6. A process for producing epoxidized liquid polybutadiene comprising dissolving liquid polybutadiene in an inert solvent; reacting said polymer with a peracid formed in situ by adding to the solution of said polymer an organic acid containing two to eight carbon atoms at a temperature of 0 to 80° C., the amount of said organic acid being sufficient to provide 0.2 to 2 equivalents per olefinic linkage, hydrogen peroxide, and phosphoric acid; separating the organic phase from the aqueous phase and removing the solvent from the organic phase thereby obtaining resulting epoxidized polymer containing 0.08 to 0.7 epoxy oxygen atom per double bond originally present in said polymer.

7. A process for producing epoxidized liquid polybutadiene comprising dissolving liquid polybutadiene in an inert solvent; reacting said polymer with a peracid formed in situ by adding to the solution of said polymer an organic acid containing two to eight carbon atoms in an amount sufficient to provide 0.2 to 2 equivalents per olefinic linkage in said polymer, hydrogen peroxide, and phosphoric acid; conducting the reaction at a temperature of 0 to 40° C. for a time of 120 to one-half hours; separating the organic phase from the aqueous phase and removing the solvent from the organic phase thereby obtaining resulting epoxidized polymer containing 0.08 to 0.7 epoxy oxygen atoms per double bond originally present in said polymer.

8. A process for producing epoxidized liquid polybutadiene comprising dissolving liquid polybutadiene in an inert solvent; reacting said polymer with peracetic acid formed in situ by adding to the solution of said polymer acetic acid in an amount sufficient to provide 0.2 to 2 equivalents per olefinic linkage in said liquid polymer, hydrogen peroxide, and sulfuric acid; conducting the reaction at a temperature of 0 to 40° C. for a time of 120 to one half hours; separating the organic phase from the aqueous phase and removing the solvent from the organic phase thereby obtaining resulting epoxidized polymer containing 0.08 to 0.7 epoxy oxygen atom per double bond originally present in said polymer.

9. A process for producing epoxidized liquid polybutadiene comprising mixing, on a weight basis, 108 parts of liquid polybutadiene and 580 parts of chloroform, adding 9.2 parts of acetic acid and 2.35 parts of phosphoric acid, and adding 68 parts of 50 percent hydrogen peroxide, the rate of said hydrogen peroxide addition being insufficient to cause the temperature of the reaction mixture to exceed 50° C., maintaining a temperature of 50° C. for 3 to 24 hours, separating the organic phase from the aqueous phase and removing the solvent from the organic phase thereby obtaining resulting epoxidized polymer containing 0.08 to 0.7 epoxy oxygen atom per double bond originally present in said polymer.

10. A process for producing epoxidized liquid polybutadiene comprising mixing, on a weight basis, 108 parts of liquid polybutadiene and 580 parts of chloroform, adding 9.2 to 50 parts acetic acid and 3.34 parts trichloroacetic acid, and adding 68 parts of 50 percent hydrogen peroxide, the rate of said hydrogen peroxide addition being insufficient to cause the temperature of the reaction mixture to exceed 50° C., maintaining a temperature of 50° C. for 3 to 24 hours, separating the organic phase from the aqueous phase and removing the solvent from the organic phase thereby obtaining resulting epoxidized polymer containing 0.08 to 0.7 epoxy oxygen atom per double bond originally present in said polymer.

References Cited in the file of this patent

UNITED STATES PATENTS

| | | |
|---|---|---|
| 1,988,448 | Hopff | Jan. 22, 1935 |
| 2,464,137 | Levy | Mar. 8, 1949 |
| 2,485,160 | Niederhauser | Oct. 18, 1949 |
| 2,556,145 | Niederhauser | June 5, 1951 |
| 2,660,563 | Banes | Nov. 24, 1953 |
| 2,692,892 | Hillyer et al. | Oct. 26, 1954 |
| 2,714,602 | Abbott | Aug. 2, 1955 |
| 2,771,472 | Ritter | Nov. 20, 1956 |
| 2,785,185 | Phillips et al. | Mar. 12, 1957 |
| 2,801,253 | Greenspan et al. | July 30, 1957 |
| 2,826,556 | Greenspan et al. | Mar. 11, 1958 |
| 2,842,513 | Fitzgerald et al. | July 8, 1958 |
| 2,914,490 | Wheelock | Nov. 24, 1959 |

FOREIGN PATENTS

| | | |
|---|---|---|
| 676,891 | Great Britain | Aug. 6, 1952 |
| 1,091,073 | France | Oct. 27, 1954 |

OTHER REFERENCES

Fitzgerald et al.: Electronic Equipment, July 1956, pp. 64–7.